United States Patent
Ogawa et al.

(10) Patent No.: US 6,702,906 B2
(45) Date of Patent: Mar. 9, 2004

(54) NI-BASE HEAT RESISTANT ALLOY AND WELDED JOINT THEREOF

(75) Inventors: Kazuhiro Ogawa, Nishinomiya (JP); Kazuyuki Kitamura, Kobe (JP); Hirokazu Okada, Kobe (JP); Yoshitaka Nishiyama, Nishinomiya (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 54 days.

(21) Appl. No.: 10/192,607

(22) Filed: Jul. 11, 2002

(65) Prior Publication Data

US 2003/0005981 A1 Jan. 9, 2003

Related U.S. Application Data

(63) Continuation of application No. PCT/JP01/10075, filed on Nov. 16, 2001.

(30) Foreign Application Priority Data

Nov. 16, 2000 (JP) ........................................ 2000-349206

(51) Int. Cl.⁷ ............................................... C22C 19/05
(52) U.S. Cl. ........................ 148/428; 420/443; 420/445; 420/446; 420/447; 420/448; 420/449; 420/450
(58) Field of Search ........................ 148/428; 420/443, 420/445, 446, 447, 448, 449, 450

(56) References Cited

U.S. PATENT DOCUMENTS

| | | | |
|---|---|---|---|
| 4,227,925 A | | 10/1980 | Hosoi et al. |
| 5,556,594 A | * | 9/1996 | Frank et al. ................. 420/448 |
| 5,882,586 A | * | 3/1999 | Tamura et al. ............... 148/410 |
| 6,447,716 B1 | * | 9/2002 | Cozar et al. ................. 420/445 |
| 6,458,318 B1 | * | 10/2002 | Nishiyama et al. .......... 420/448 |
| 6,528,012 B2 | * | 3/2003 | Nishimoto et al. ............ 420/94 |

FOREIGN PATENT DOCUMENTS

| | | |
|---|---|---|
| JP | 51-84726 | 7/1976 |
| JP | 51-84727 | 7/1976 |
| JP | 57-023050 | 2/1982 |
| JP | 01-152245 | 6/1989 |
| JP | 02-008336 | 1/1990 |
| JP | 02-267240 | 11/1990 |
| JP | 04-358037 | 12/1992 |
| JP | 05-033090 | 2/1993 |
| JP | 05-033091 | 2/1993 |
| JP | 5-033092 | 2/1993 |
| JP | 05-239577 | 9/1993 |
| JP | 06-207235 | 7/1994 |
| JP | 09-227975 | 9/1997 |

* cited by examiner

*Primary Examiner*—John Sheehan
(74) *Attorney, Agent, or Firm*—Burns, Doane, Swecker & Mathis, LLP

(57) ABSTRACT

A Ni-base heat resistant alloy excellent in weldability and strength at elevated temperatures and suited for use in manufacturing cracking furnace tubes and reformer furnace tubes to be used in ethylene plants as well as a welded joint therefor is provided. The alloy of the invention is a Ni-base heat-resistant alloy, which comprises C: not more than 0.1%, Si: not more than 2%, Mn: not more than 2%, P: not more than 0.025%, S: not more than 0.005%, N: not more than 0.04%, Cr: 10 to 30%, Al: 2.1 to less than 4.5%, and Mo: 2.5 to 15% or W: 2.5 to 9% or Mo and W: 2.5 to 15% in total, and satisfies the relation (1) given below:

$$(104Si+1980P+1980S+9Al+15Ti+11Nb+1.8W+11600B) \leq \{1.1(240-20000S-1900P-30Al-10Ti-9W+17000B) \quad (1)$$

In the welded joint of the invention, both of the base metal and weld metal are made of the alloy having the above composition, and the ST value of the weld metal as calculated according to the following formula (2) or (3) is larger by not less than 3 than the ST value of the base metal:

$$\text{in the case of Ti} \leq 4C; \quad ST = Mo+1.5W+100Ti \quad (2)$$

$$\text{in the case of Ti} > 4C; \quad ST = Mo+1.5W+400C \quad (3).$$

8 Claims, No Drawings

NI-BASE HEAT RESISTANT ALLOY AND WELDED JOINT THEREOF

This application is a continuation of International Application No. PCT/JP01/10075 filed on Nov. 16, 2001 and claims priority under 35 U.S.C. §§119 and/or 365 to 2000-349206 filed in Japan on Nov. 16, 2000; the entire content of which is hereby incorporated by reference.

TECHNICAL FIELD

The present invention relates to a Ni-base heat resistant alloy excellent in hot workability, weldability and carburization resistance and in strength at elevated temperatures, and relates to a welded joint thereof. In particular, it relates to a Ni-base heat resistant alloy to serve as a material for manufacturing tubes, plates and other members with a view to giving a welded structure to be used in a cracking furnace or a reformer furnace in an ethylene plant, and to a welded joint thereof. The cracking furnace or reformer furnace in an ethylene plant is a furnace in which a hydrocarbon raw material, such as naphtha, propane, ethane or a gas oil, is cracked or reformed at elevated temperatures, not lower than 800° C., to produce fundamental petrochemical products such as ethylene and propylene.

BACKGROUND ART

The temperature at which the cracking furnace and reformer furnace in an ethylene plant are used tends to become higher and higher in order to increase the yield of ethylene and the like.

The tube material, for use in such a cracking furnace and a reformer furnace, is required to have good heat resistance, inclusive of it's strength at elevated temperatures resistance to carburization, since the inner surface thereof is exposed to a carburizing atmosphere. On the other hand, the so-called coking, namely the phenomenon of the deposition of the carbon on the tube inner surface, occurs during operation and, as the amount of the deposit increases, the tube's internal pressure increases, the heating efficiency decreases and other operational troubles occur.

Therefore, in actual operation, the so-called decoking work for removing carbon deposit by means of air or steam is performed at regular intervals. The shutdown during decoking and the number of working steps are major problems. The severity of such coking and related problems increase as the tube becomes a smaller diameter tube, which is favorable for yield improvement.

A prior art technology for preventing coking, as shown in JP Kokai H02-8336, causes an alloy to contain not less than 28 mass % of Cr and thus causes a formation of a firm and stable $Cr_2O_3$ film on the alloy surface. The film prevents Fe and Ni, which are catalyst elements, promoting carbon deposition, from the exposure on the surface, and thereby suppress coking.

On the other hand, in order to improve the carburization resistance, it is known to be effective to increase the Si content in the alloy, as described in JP Kokai S57-23050, for instance.

However, these prior art technologies have problems, as mentioned below.

In applying a high Cr alloy, as proposed in JP Kokai H02-8336, as an elevated temperature strength material from the viewpoint of coking prevention, it is necessary to render the metallographic structure austenitic by raising the Ni content in the alloy. However, when merely an austenitic structure is obtained, the strength at elevated temperatures is low compared with conventional alloys, hence it is difficult to apply the material singly as an elevated temperature strength material. JP Kokai H02-8336 indicates the use of the material in combination with other elevated temperature strength material in the form of a double-layers tube. However, the double-layers tube has problems from the viewpoint of production cost and reliability.

When the Si content in the alloy is increased, as taught by JP Kokai S57-23050, the susceptibility to weld crack increases, hence there arises a problem that it cannot be practically used in the form of a welded structure.

On the contrary, alloys caused to form a firm and dense $Al_2O_3$ film on the metal surface by increasing the Al content therein, as shown in JP Kokai H04-358037, JP Kokai H05-239577, JP Kokai H05-33092 and JP Kokai H06-207235, show a markedly improved resistance to carburization and to coking as compared with conventional alloys. When the Ni content is increased in such high Al alloys, $\gamma'$ phase precipitates finely in the matrix during use at elevated temperatures and the creep rupture strength is also markedly improved. Thus, the alloys described in the above-cited publications are characterized by having good resistance to carburization, and to coking at elevated temperatures, and high creep strength; therefore are suited for use as tubes of cracking furnace and reformer furnace in an ethylene plant.

However, for the alloys described in the above-cited publications, no due consideration was taken for the weldability, in particular weld crack resistance, in composition designing. No sufficient consideration was given, either, in designing the composition of the weld metal itself for constituting welded joints. Ni-base alloys, having a high Al content, are susceptible to cracking in the heat affected zone (hereinafter also referred to as "HAZ") affected in the step of welding, as well as in the weld metal and, in addition, the weld metal tends to become lower in creep strength at elevated temperatures as compared with the base metal.

Since the weld metal is used in a solidified structure, unlike the base metal that is in a hot-worked and heat-treated condition, the creep strength at elevated temperatures of the weld metal tends to be low. Therefore, for obtaining materials useful in practical use, it is important, in designing the composition of the base metal and of the weld metal, to take into consideration measures for reducing the susceptibility to cracking in the step of welding and also for preventing the creep strength of welded joints from decreasing.

DISCLOSURE OF INVENTION

It is an objective of the present invention to provide a Ni-base heat resistant alloy and a welded joint made thereof, which are excellent in resistance to carburization and to coking in the environment, in which tubes of cracking furnace and reformer furnace in an ethylene plant are placed, namely in the environment in which carburization, oxidation and repeated temperature changes occur, and which have good weldability and strength at elevated temperatures.

The gist of the present invention consists in (1) a Ni-base heat resistant alloy as mentioned below, and (2) a welded joint made thereof as mentioned below. In the following, "%" for each constituent content is "% by mass".

(1) A Ni-base heat resistant alloy consisting of C: not more than 0.1%, Si: not more than 2%, Mn: not more than 2%, P: not more than 0.025%, S: not more than 0.005%, N: not more than 0.04%, Cr: 10 to 30%, Al: 2.1 to less than 4.5%, and Mo: 2.5 to 15% or W: 2.5 to 9% or Mo and W: 2.5 to 15% in total, Ti: 0 to 3%, Nb: 0 to 1%, V: 0 to 1%, Ta: 0 to 2%, Zr: 0 to 0.2%, Hf: 0 to 0.8%, B: 0 to 0.03, Mg: 0 to 0.01%, Ca: 0 to 0.01%, Fe: 0 to 10%, La: 0 to 0.1%, Ce: 0 to 0.1%, Nd: 0 to 0.1%, Y: 0 to 0.1%, Cu: 0 to 5%, and Co: 0 to 10%, and the balance being substantially Ni, and satisfying the relation (1) given below.

$$(104Si+1980P+1980S+9Al+15Ti+11Nb+1.8W+11600B) \leq \{1.1(240-20000S-1900P-30Al-10Ti-9W+17000B) \quad (1)$$

wherein the symbols for elements in the above relation (1) are the contents (% by mass) of the respective elements contained in the alloy.

Among the above constituents, the content of Ti is desirably not more than 1.5%.

(2) A welded joint in which each of the base metal and weld metal is made of a Ni-base heat resistant alloy consisting of C: not more than 0.1%, Si: not more than 2%, Mn: not more than 2%, P: not more than 0.025%, S: not more than 0.005%, N: not more than 0.04%, Cr: 10 to 30%, Al: 2.1 to less than 4.5%, and Mo: 2.5 to 15% or W: 2.5 to 9% or Mo and W: 2.5 to 15% in total, Ti: 0 to 3%, Nb: 0 to 1%, V: 0 to 1%, Ta: 0 to 2%, Zr: 0 to 0.2%, Hf: 0 to 0.8%, B: 0 to 0.03%, Mg: 0 to 0.01%, Ca: 0 to 0.01%, Fe: 0 to 10%, La: 0 to 0.1%, Ce: 0 to 0.1%, Nd: 0 to 0.1%, Y: 0 to 0.1%, Cu: 0 to 5% and Co: 0 to 10%, and the balance substantially being Ni, and satisfying the relation (1) given below, and further satisfying the condition that the ST value of the weld metal is larger than the ST value of the base metal, and the difference between the former and the latter is not smaller than 3, wherein the ST value is defined by the formula (2) or (3) given below:

$$(104Si+1980P+1980S+9Al+15Ti+11Nb+1.8W+11600B) \leq \{1.1(240-20000S-1900P-30Al-10Ti-9W+17000B) \quad (1)$$

in the case of Ti≤4C; ST=Mo+1.5W+100Ti (2)

in the case of Ti>4C; ST=Mo+1.5W+400C (3)

wherein the symbols for elements in the formulas (1) to (3) are the contents (% by mass) of the respective elements contained in the base metal or weld metal.

Among the above constituents, the content of Ti is desirably 0.005 to 1.0%.

The Ni-base alloy of the present invention is suited for use as ethylene cracking furnace and reformer furnace tubes. The welded joints therefor are preferably the welded joints according to the present invention.

As a result of experiments and investigations made in an attempt to accomplish the object mentioned above using Ni-base alloys having a Cr content of 10 to 30% and an Al content of 2.1 to less than 4.5% and containing one or both of 2.5 to 15% of Mo and 2.5 to 9% of W (a total of 2.5 to 15% for the case of both being contained), the present inventors obtained the findings mentioned below. The present invention have been completed based on the findings.

Cracking in the HAZ occurs as follows. Upon exposure to a welding heat cycle, a grain boundary in the base metal, which is close to the boundary of the weld metal and heated to a high temperature, cracks from a site partially melted, and this crack propagates to the lower temperature HAZ side that has experienced intergranular embrittlement. Thus, a weld crack in the HAZ could occur when the welding thermal stress exceeds the intergranular binding force reduced in the above manner.

Therefore, the effects of alloying elements on the partial grain boundary melting and on the intergranular embrittlement occurring on the lower temperature side were quantitatively evaluated in an attempt to quantitatively evaluate the resisting force.

As a result, it was found that when the energy release rate A, on the occasion of crack formation from the member material with a quantity of melting at grain boundary BI under a weld thermal stress R, satisfies the relation (4) shown below, no cracking occurs even if grain boundary melting partially occurs:

$$(A=C \times R^2 \times BI) \leq DI \quad (4)$$

In the above formula, C is a constant, and DI denotes the intergranular binding force. The BI and DI depend on the chemical composition of the alloy. Thus, the BI increases with the increase in content of elements (e.g., Si, P, Al, Ti, Nb, W, B) readily causing boundary melting, and the DI decreases with the increase in content of elements (e.g., S, P, Al, Ti, W) readily causing boundary embrittlement. Therefore, when the content of elements readily causing boundary embrittlement increases, it becomes difficult for the relation (4) to be satisfied.

Theoretically, the quantity of melting at grain boundary BI can be determined by the formula (5) shown below. In the formula (5), for each element i, the degree of lowering of the liquidus temperature per 1% of the element "i" in the equilibrium diagram is "mi", the solid-liquid partition coefficient is "ki", the grain boundary segregation ratio is "bi" and the content of element "i" is Xi. As a result of experiments, however, the value calculated according to the formula (6) shown below can be used as the BI.

$$BI=\Sigma\{mi/(bi-1)/ki\} \times Xi \quad (5)$$

$$BI=104Si+1980P+1980S+9Al+15Ti+11Nb+1.8W+11600B \quad (6)$$

Further, as a result of experiments made to quantitatively evaluate the effects of the respective elements on the grain boundary bonding strength of Ni atoms by breaking tests at elevated temperatures, it was found that the value calculated according to the formula (7) given below can be used as the intergranular binding force DI:

$$DI=240-20000S-1900P-30Al-10Ti-9W+17000B \quad (7).$$

On the other hand, strictly, the weld thermal stress R is influenced by the welding conditions and the shape and size of the welded joint, in particular the plate thickness or wall thickness. In the case of Ni-base heat resistant alloys mainly intended for TIG welding, the heat input is at most about 20 kJ/cm, and the influence of such a level of heat input is not significant.

However, the influence of the plate thickness on the welding heat stress is significant, and the weld thermal stress R rapidly increases with the increase in the plate thickness up to a plate thickness of 10 mm. Therefore, welding simulation experiments were carried out for checking the occurrence or nonoccurrence of cracking under the most severe, completely restrained conditions employing a plate thickness of 25 mm, which is supposed to be close to the upper limit to the thickness of welded structures.

As a result, it was found that when the composition is adjusted so that the BI value calculated according to the formula (6) may be not more than 1.1 times the DI value calculated according to the formula (7), namely that the relation (1) given hereinabove may be satisfied, no cracking occurs in the HAZ in the step of welding.

Then, based on the base metal adjusted in composition to satisfy the relation (1) mentioned above, endeavors were made to develop a weld metal capable of providing a welded joint, low in susceptibility to weld cracking and comparable in creep strength to the base metal.

The reason why the creep strength of the weld metal decreases as compared to the base metal is that Mo and/or W, which behaves as a solute in the base metal matrix and effectively contributes to reinforcement of the base metal, dose not contribute so effectively in the weld metal as in the base metal because of segregation in solidification. Therefore, it is necessary to have the weld metal contain a larger amount of Mo and/or W than the base metal.

However, when the base metal contains a sufficiently high content of Mo and/or W, it is difficult to have the weld metal contain a still larger amount of Mo and/or W. Having the weld metal contain a large amount of Mo and/or W, it is necessary to increase the Mo and/or W content in the welding consumables and, if this is done, the hot workability in the step of preparing the welding consumables decreases.

Therefore, conditions were searched under which the creep strength of the weld metal will not decrease, as compared to the base metal, without having the weld metal contain a larger amount of Mo and/or W as compared to the base metal. As a result, it was found that an appropriate amount of TiC as distributed along grain boundaries in the weld metal is effective for the purpose. More concretely, it was found that when the contents of Mo, W, C and Ti in the weld metal are adjusted, so that the ST value calculated according to the formula (2) or (3) given hereinabove, depending on the Ti content in the base metal or weld metal, may be greater in the weld metal than in the base metal, and the difference between the former and the latter may be not smaller than 3, the weld metal, which has a solidified structure, becomes almost comparable in creep strength to the base metal.

In multilayer welding, the weld metal is exposed to the same heat cycle as the HAZ in the next layer welding and possibly cracks in the same manner as the HAZ cracking in the base metal. It was found, however, that when the weld metal satisfies the above-mentioned relationship (1), no weld cracking occurs, similar to the base metal.

In regards to the basic composition of the alloy of the present invention, the present inventors made various experiments and investigations by melting various alloys differing in chemical composition for the purpose of attaining satisfactory hot workability, which is an essential feature of practical mass-production of the alloy, in addition to the above-mentioned weldability, without reducing the carburization resistance and coking resistance at elevated temperatures and, as a result, they obtained the following findings.

(a) In alloys containing not less than 1% of Al, Al-base nitrides are readily formed and the Al-base oxide film, mainly composed of $Al_2O_3$, loses its protective activity with the above-mentioned nitride precipitate as a starting point.

(b) However, when the N content is reduced while maintaining the content of Cr, which is effective in increasing the solubility of N, at 10% or above, N is sufficiently dissolved and the AlN will not precipitate on the alloy surface. Therefore, even when the Al content is not less than 1%, the protective activity of the oxide film mainly composed of alumina on the alloy surface will not be impaired, but good carburization resistance and coking resistance can be secured. In addition, the strength at elevated temperatures is improved.

(c) When the Al content is suppressed to a level below 4.5%, the hot workability and weldability are improved. However, the hot workability is not sufficient when compared with the conventional Fe—Cr—Ni or Ni—Cr alloys and when mass production is taken into consideration.

Namely, during hot working, Ni—Al intermetallic compounds precipitate and the crystal grain is markedly intensified, so that the grain boundaries become relatively weak. When the grain is strengthened, greater force has to be applied in the step of working or processing. Then, the relatively weak grain boundaries may readily be fractured, so that the hot workability decreases. Therefore, for improving the hot workability, it is necessary to strengthen the grain boundaries as well, in a manner comparable to the strengthening of the grain.

(d) On the other hand, in Ni-base alloys high in Al content, the grain boundaries themselves are weak. One of the main causes of this weakness is S. Therefore, for preventing the grain boundaries from weakening, it is very important to restrict the S content to 0.005% or below. By restricting it to 0.003% or below, a further improving effect can be expected.

(e) Furthermore, it is important to reduce the N content as far as possible. This is because, in Ni-base alloys high in Al content, the N in the metal readily forms Al-base nitrides, as mentioned above, and this nitride precipitate markedly reduces the hot workability.

(f) B, Zr and Hf increase the inter-atomic bonding strength at grain boundaries and produce a grain boundary strengthening effect. Therefore, for preventing the hot workability from decreasing, it is recommendable to have the alloy contain one or more of these elements.

MODES OF EMBODIMENT OF THE INVENTION

In the following, the grounds for the selection of the chemical composition of the Ni-base heat resistant alloy of the invention are described in detail. This Ni-base alloy serves as the base metal in the welded joint.

Unless otherwise specified, the following description of the respective elements and so forth is commonly applicable to the Ni-base heat resistant alloy and the weld metal constituting the welded joint.

The Ni-base heat resistant alloy of the invention and the base metal (the above Ni-base heat resistant alloy) and weld metal constituting the welded joint thereof are all required satisfying the following relationship (1):

$$(104Si+1980P+1980S+9Al+15Ti+11Nb+1.8W+11600B) \leq \{1.1(240-20000S-1900P-30Al-10Ti-9W+17000B)\} \quad (1)$$

The symbols for elements in the relationship (1) mean the contents (% by mass) of the respective elements contained in the base metal alloy and in the weld metal.

To satisfy the above relationship (1) is a condition essential for preventing weld crack. The relationship (1) means that the combination of constituents should be selected, as mentioned hereinabove, within a range such that the local fracture stress caused by and depending on the partial melting of grain boundaries in the region heated to just below the melting point upon welding will not exceed the fracture resistance in the adjacent grain boundary embrittled region. Only when this relationship (1) is satisfied, it becomes possible to prevent the weld cracking from occurring.

The welded joint, according to the invention, should satisfy the following conditions.

When the ST values are calculated, according to the formula (2) or (3) given below for the base metal and weld metal constituting the joint, respectively, the ST value for the weld metal should be greater than the ST value for the base metal and the difference therebetween should be not less than 3. Only in this instance, can the creep strength of the weld metal, which forms a solidified structure, become comparable to and is balanced against the creep strength of the base metal owing to synergistic effects of the solid solution strengthening and the strengthening by dispersed TiC.

In the case of Ti≦4C; ST=Mo+1.5W+100Ti    (2)

In the case of Ti>4C; ST=Mo+1.5W+400C    (3)

It is necessary that the above two conditions should be satisfied within the content ranges of the respective alloy constituents as mentioned hereinbelow. This is evident also from the results of the examples mentioned later herein.

C: not more than 0.1%

C is an element effective in forming carbides and improving the tensile strength and the creep rupture strength required of heat resistant alloys, hence its content is desirably to be not less than 0.01%. However, if the content thereof exceeds 0.1%, not only the reduction in ductility and toughness of the alloy increases, but also the alumina coat film formation on Ni-base alloys high in Al content is inhibited. Therefore, the upper limit to the C content has been set at 0.1%. A preferred upper limit is 0.09% and a more preferred upper limit is 0.07%.

Si: not more than 2%

Si is an element added as a deoxidizing agent and contributes to the improvement in oxidation resistance and carburization resistance. In Ni-base alloys high in Al content, its effects on improving oxidation resistance and carburization resistance are relatively small while its effects reducing hot workability and weldability are strong. Therefore, from the production viewpoint, it is recommended it's content should be low, in particular when the hot workability is regarded as important. Considering, however, that there are cases where it is necessary to obtain improved effects on the oxidation resistance and carburization resistance, the upper limit is set at 2%. A preferred upper limit is 1.5% and a more preferred upper limit is 1%. The effects of improving the oxidation resistance and carburization resistance become significant at an addition level of not less than 0.2%.

Mn: not more than 2%

Mn is an element added as a deoxidizing agent. However, since it promotes the formation of spinel type oxide coat films causing deterioration in coking resistance, it is necessary to suppress its content to a level not higher than 2%. A preferred upper limit is 1.5% and a more preferred upper limit is 1%. While the Mn content may be at an impurity level, it is desirable to add it at a level of 0.1% or higher for securing the deoxidizing effect.

S: not more than 0.005%

S is a very harmful element segregating along grain boundaries to thereby weaken the inter-granular bonding strength and deteriorate the weldability, hence it is very important to control its level at or below the upper limit. In Ni-base alloys high in Al content, in particular, grain boundary strengthening becomes important, hence it is preferred that the S content be reduced as far as possible. For attaining an improvement in weldability, it is necessary to reduce its content to at most 0.005%. Therefore, the upper limit has been set at 0.005%.

P: not more than 0.025%

P is a harmful element segregating along grain boundaries to weaken the inter-granular bonding strength and, further, it lowers the grain boundary melting point, and thereby promotes partial grain boundary melting in the high temperature HAZ (base metal portion adjacent to the melting boundary) and cause weld cracking, hence it is desirably to keep it's content as low as possible. Up to 0.025%, however, no particular problems arise and, accordingly, the upper limit has been set at 0.025%.

N: not more than 0.04%

N is effective in increasing the elevated temperature strength of ordinary heat resistant steels through solid solution strengthening and therefore is used positively. In Ni-base alloys high in Al content, however, it precipitates as nitrides such as AlN and, therefore, not only no solid solution strengthening can be expected, but also it markedly impairs the hot workability and weldability. Furthermore, the nitrides become starting points for breakdown of the protective film and thus lowers the carburization resistance. Therefore, it is desirable to keep the N content as low as possible. Considering, however, that no particular problems arise up to 0.04% and that an excessive reduction in N content may result in an increase in production cost and a decrease in yield, the upper limit has been set at 0.04%. A preferred upper limit is 0.03% and a more preferred upper limit is 0.02%.

Cr: 10 to 30%

Cr is an element effective in improving the oxidation resistance and coking resistance and also effective in causing formation of a uniform alumina coat film in the early stage of alumina coat film formation. It also forms carbides and contributes to the improvement in creep rupture strength. In the constituent system defined in accordance with the present invention, Cr also contributes to improvement in hot workability. In order to produce these effects, at least 10% of Cr is required. On the other hand, an excessive content of Cr impairs such mechanical properties as toughness and workability. Therefore, the range of 10 to 30% has been selected for the Cr content. A preferred range is 12 to 25% and a more preferred range is 12 to 23%.

Al: 2.1% to less than 4.5%

Al is an element very effective in improving the carburization resistance and coking resistance and improves the strength at elevated temperatures. In order to produce these effects, it is necessary to cause uniform formation of a corundum type alumina oxide film. Further, Al forms the γ' phase [$Ni_3$(Al, Ti) intermetallic compounds] and thus produces a precipitation strengthening effect. For obtaining these effects, at least 2.1% of Al is required. On the other hand, at a level of 4.5% or above, the susceptibility to weld cracking markedly increases. Therefore, the range of 2.1% to less than 4.5% has been selected for the Al content. A preferred range is 2.1 to 4% and a more preferred range is 2.1 to 3.5%.

Mo: 2.5 to 15%, W: 2.5 to 9%, in the case of both being contained, the total content being 2.5 to 15%

Each of these elements is effective as a solid-solution strengthening element, which strengthens the austenitic phase in the material and thereby increases the creep rupture strength. For producing such effects, each is required at a content of not less than 2.5% and the total content of both is required to be not less than 2.5%. However, excessive contents thereof result in precipitation of intermetallic compounds causing decreases in toughness and, at the same time, cause deterioration in carburization resistance and/or coking resistance. The total content of Mo and W should be suppressed to 15% or below. However, since W causes greater decreases in hot workability and weldability due to intermetallic compound precipitation compared with Mo, it is necessary to lower the upper limit to the W level compared with Mo. Therefore, the contents of these elements should not be higher than 15% in the case of Mo and not be higher than 9% in the case of W and, in the case of combined use, not higher than 15% in total. The total content is preferably within the range of 4 to 13%, more preferably within the range of 6 to 13%.

B:

B may not be added, however when it is added, it is effective in strengthening grain boundaries and contributes to reduction in susceptibility to weld cracking. Therefore, it can be added when such effect is desired. The effect becomes significant at a content of not less than 0.001%. However, when the B content exceeds 0.03%, the susceptibility to weld cracking may increase. Therefore, when it is added, the B content is preferably 0.001 to 0.03%.

Ti:

Ti may not be added, however when it is added, it promotes γ' phase precipitation and contributes to improve the creep rupture strength and, in addition, Ti precipitates as TiC and contributes to improve the creep rupture strength of the weld metal. Such effects become significant at a content level of 0.005%. However, at a content level exceeding 3%, the γ' phase precipitates out in excess, markedly deteriorating the weldability. Therefore, when it is added, the preferable content is 0.005 to 3%. A more preferred upper limit is 1%.

Zr, Hf:

These elements may not be added, however when they are added, each element segregates along grain boundaries and contributes to improvement in creep strength by suppressing grain boundary sliding. Therefore, when this effect is desired, one or both can be added, and the effect becomes significant at 0.01% or above for each element. However, when the Zr content exceeds 0.2% or when the Hf content exceeds 0.8%, each element may cause a decrease in creep rupture strength. Therefore, when they are added, the Zr content is recommendably 0.01 to 0.2% and the Hf content 0.01 to 0.8%.

Mg, Ca:

These elements may not be added, however when they are added, each element combines with S, which is harmful principally to hot workability, and forms a sulfide, and it increases the grain boundary strength and contributes to improvement in hot workability. Therefore, when such effects are desired, one or both may be added. The effects become significant if the content is not less than 0.0005% for each element. However, if the content exceeds 0.01%, they remain in a solid solution state in the alloy and may reduce the hot workability and weldability Therefore, when they are added, it is recommended to keep the content of each element between 0.0005 and 0.01%. When these elements are added, it is desirable that the contents of Mg and Ca be such that the value calculated according to the formula "(1.178 Mg+Ca)/S" may fall within the range of 0.5 to 3. In this case, the hot workability-improving effect is much greater.

Fe:

Fe may not be added, however when it is added, it improves the creep ductility and contributes to improvement in creep rupture strength and, in addition, contributes to improvements in hot workability and cold workability. Therefore, when such effects are desired, it may be added, and the effects become significant at a content of not less than 0.1%. However, at contents exceeding 10%, both the creep rupture strength and hot workability rather decrease, therefore, when it is added, it is recommended to keep the Fe content between 0.1 and 10%.

Nb, V, Ta:

These elements may not be added, but when they are added, each element serves as a solid solution element in the austenitic phase and strengthens the material and, in addition, forms a carbide and thus contributes to improvement in creep rupture strength. Therefore, when such effects are desired, one or more of them may be added. The effects become significant at a content of 0.01% or above for each element. However, contents of Nb or V exceeding 1% or Ta contents exceeding 2% cause a decrease in toughness. Therefore, when they are added, it is recommended to keep the content of Nb or V between 0.01 and 1% and that of Ta between 0.01 and 2%. A preferred upper limit of the Nb or V content is 0.8% and a preferred upper limit of the Ta content is 1.8% and, when two or more of them are added in combination, a desirable upper limit to the total content is 3%.

La, Ce, Nd, Y:

These elements may not be added, but when they are added, each element prevents the alumina film from peeling off mainly under heat cycle conditions and also effectively improves the carburization resistance and coking resistance even during use in an environment in which the temperature changes. Therefore, when such effects are desired, one or more of them may be added. The effects become significant at a content of not less than 0.002% for each element. However, for each element, when the content exceeds 0.1%, the alumina film peeling preventing effect arrives at saturation and, in addition, the workability deteriorates. Therefore, when they are added, it is recommended to keep the content of each element between 0.002 and 0.1%.

Cu, Co:

These elements may not be added, but when they are added, each element contributes mainly to the stabilization of the austenitic phase and, in addition, Co contributes to improvement in creep strength through solid solution strengthening. Therefore, when these effects are desired, one or both may be added. The effects become significant at a content of not less than 0.01% for each element. However, when the Cu content exceeds 5% or the Co content exceeds 10%, the toughness and workability are impaired. Therefore, when they are added, it is recommended to keep the Cu content between 0.01 and 5% and the Co content between 0.01 and 10%. A preferred upper limit to the Cu content is 3% and a more preferred upper limit is 1.5%, while a preferred upper limit to the Co content is 8% and a more preferred upper limit is 5%.

The Ni-base heat-resisting alloy of the present invention can be obtained by subjecting the corresponding alloy composition to ordinary steps of melting and refining, followed by casting. The alloy may be used as cast. Generally, after casting, the alloy is used in the form of tubes or other products prepared through working steps, such as the steps of forging, hot working and cold working. The products may also be produced by the technology of powder metallurgy. Heat treatment promotes structure homogenization and contributes to improvements in performance characteristics of the alloy of the invention. The heat treatment is preferably carried out in the manner of homogenization at 1,100 to 1,300° C. The alloy may also be used as cast or as worked or processed.

The alloy of the invention can also be used as welding consumables of similar composition to the base metal after working into wires. A welded joint can be obtained by TIG welding, for instance, using the welding consumables. On that occasion, the weld metal should have the above-mentioned composition from the viewpoint of use performance and weld cracking prevention. It is necessary that, within the composition range, the ST value calculated for the weld metal according to the formula (2) or (3) given hereinabove is greater by not less than 3 than the ST value calculated for the base metal. Thereby, the weld metal can become comparable in creep strength to the base metal.

The weld metal is formed upon melting and fusing of the welding consumables and part of the base metal. Therefore, the composition of the weld metal can be adjusted by selecting the composition of the welding consumables taking into consideration the base metal composition and the dilution ratio.

EXAMPLE

Twenty base metals having the respective chemical compositions specified in Table 1 and nine welding consumables having the respective chemical compositions specified in Table 2 were prepared. The base metals and welding consumables were each melted in a vacuum melting furnace with a capacity of 50 kg. The ingot obtained was hot-forged into a plate having a thickness of 25 mm and this was subjected to solution heat treatment at 1,250° C. and thereafter used as the base metal. Separately, the above ingot was subjected to the steps of hot forging, hot rolling and cold drawing in order to produce a wire having an outside diameter of 2 mm and this was used as the welding consumables.

Using the base metals and welding consumables prepared in the above manner, welded joint production tests were carried out in the following manner. Two test specimens, having a width of 100 mm and a length of 200 mm and V-groove along one longer side with a half angle of 20°, were taken from each base metal. The V-grooved longer edges of these two test specimens were butted to each other, placed on a steel plate with a thickness of 50 mm, a width of 150 mm and a length of 250 mm, and completely restrained by shielded metal arc welding (3 passes) around the whole four sides. Then, the butted V-grooved portions were subjected to multilayer welding by the TIG welding. The welding conditions were as follows: welding current 130 A, welding voltage 12 V and welding speed 15 cm/min. Using various combinations of the base metals and welding consumables prepared, 23 welded joints respectively, having weld metals with the chemical compositions shown in Table 3, were produced.

TABLE 1

| Mark | \multicolumn{13}{c}{Chemical Composition of Base Metal (mass %, bal.: substantially Ni)} | BI Value | DI Value | BI/DI |
|---|---|---|---|---|---|---|---|---|---|---|---|---|---|---|---|---|---|
| | C | Si | Mn | P | S | Cr | Al | Mo | W | N | Ti | B | Fe | Others | | | |
| AM0 | 0.018 | 0.23 | 0.47 | 0.010 | 0.001 | 24.44 | 3.68 | 8.15 | — | 0.013 | — | — | — | | 78.82 | 90.60 | 0.87 |
| AM1 | 0.023 | 0.12 | 0.56 | 0.013 | 0.002 | 16.40 | 3.12 | 9.35 | 1.99 | 0.014 | 0.20 | 0.0031 | 3.00 | | 112.80 | 114.49 | 0.99 |
| AM2 | 0.020 | 0.22 | 0.54 | 0.012 | 0.001 | 24.46 | 3.65 | 8.97 | 0.02 | 0.009 | 0.20 | 0.0029 | 3.01 | Zr: 0.12 | 118.15 | 134.82 | 0.88 |
| AM3 | 0.019 | 0.18 | 0.53 | 0.015 | 0.001 | 17.81 | 3.33 | 6.02 | 2.87 | 0.020 | 0.10 | 0.0031 | 4.94 | Hf: 0.14 | 123.00 | 117.47 | 1.05 |
| AM4 | 0.017 | 0.10 | 0.42 | 0.009 | 0.001 | 18.41 | 4.47 | 9.02 | — | 0.023 | 0.01 | 0.0031 | 5.02 | Mg: 0.01 | 106.54 | 121.40 | 0.88 |
| AM5 | 0.019 | 0.04 | 0.46 | 0.012 | 0.004 | 17.94 | 2.76 | 10.18 | — | 0.017 | 0.01 | 0.0041 | 4.95 | Ca: 0.005 | 108.39 | 124.00 | 0.87 |
| AM6 | 0.010 | 0.11 | 0.42 | 0.018 | 0.002 | 15.34 | 3.16 | 8.24 | — | 0.015 | 0.40 | 0.0022 | 5.04 | Nb: 0.21 | 113.31 | 104.40 | 1.09 |
| AM7 | 0.011 | 0.06 | 0.57 | 0.007 | 0.001 | 15.87 | 4.43 | 10.56 | 3.69 | 0.021 | — | 0.0046 | 2.94 | | 121.95 | 118.79 | 1.03 |
| AM8 | 0.020 | 0.21 | 0.50 | 0.014 | 0.001 | 24.10 | 3.71 | 8.63 | 0.02 | 0.010 | 0.20 | 0.0033 | 3.07 | Cu: 2.14 | 126.25 | 136.02 | 0.93 |
| AM9 | 0.018 | 0.24 | 0.57 | 0.010 | 0.001 | 24.41 | 3.51 | 8.80 | 0.02 | 0.024 | 0.20 | 0.0034 | 3.07 | Co: 7.32 | 120.81 | 151.32 | 0.80 |
| AM10 | 0.018 | 0.26 | 0.56 | 0.011 | 0.001 | 25.00 | 3.83 | 9.30 | 0.02 | 0.007 | 0.21 | 0.0025 | 3.05 | Nd: 0.05 | 117.46 | 124.42 | 0.94 |
| AM11 | 0.020 | 0.19 | 0.46 | 0.012 | 0.001 | 23.95 | 3.49 | 9.04 | 0.02 | 0.018 | 0.20 | 0.0031 | 3.09 | Y: 0.04 | 115.91 | 143.02 | 0.81 |
| AM12 | 0.021 | 0.20 | 0.45 | 0.011 | 0.001 | 25.23 | 3.71 | 8.61 | 0.02 | 0.007 | 0.19 | 0.0033 | 2.93 | La: 0.04 | 119.12 | 141.82 | 0.84 |
| AM13 | 0.017 | 0.20 | 0.55 | 0.013 | 0.001 | 24.55 | 3.67 | 8.68 | 0.02 | 0.019 | 0.20 | 0.0034 | 3.02 | Ce: 0.05 | 124.03 | 140.82 | 0.88 |
| AM14 | 0.019 | 0.25 | 0.60 | 0.014 | 0.001 | 24.32 | 3.74 | 9.05 | 0.02 | 0.023 | 0.20 | 0.0023 | 3.12 | Ta: 1.23 | 119.08 | 118.12 | 1.01 |
| BM1 | 0.023 | 0.22 | 0.53 | 0.012 | 0.002 | 18.06 | 4.38 | 7.65 | — | 0.009 | 0.41 | 0.0044 | 5.01 | | 147.21 | 116.50 | * 1.26 |
| BM2 | 0.017 | 0.13 | 0.46 | 0.012 | 0.002 | 16.51 | 3.36 | 9.45 | 2.21 | 0.018 | 2.03 | 0.0033 | 5.10 | | 144.19 | 92.31 | * 1.56 |
| BM3 | 0.016 | 0.23 | 0.49 | 0.018 | 0.004 | 16.42 | 2.78 | 9.03 | — | 0.018 | — | 0.0036 | 2.91 | | 134.26 | 103.60 | * 1.30 |
| BM4 | 0.028 | 0.27 | 0.53 | 0.016 | 0.002 | 15.81 | 3.28 | 9.33 | — | 0.012 | — | 0.0034 | 3.08 | Nb: 0.96 | 143.24 | 129.00 | * 1.11 |
| BM5 | 0.022 | 0.23 | 0.55 | 0.018 | 0.002 | 15.80 | 3.19 | 9.27 | 1.95 | 0.022 | — | 0.0033 | 3.01 | | 134.02 | 108.65 | * 1.23 |

Note 1)
BI value was calculated by a formula [104Si + 1980P + 1980S + 9Al + 15Ti + 11Nb + 1.8W + 11600B]
DI value was calculated by a formula [240 − 1900P − 20000S − 30Al − 10Ti − 9W + 17000B]
Note 2)
"*" indicates a value out of the scope of this invention.

TABLE 2

| Mark | \multicolumn{13}{c}{Chemical Composition of Weld Consumable (mass %, bal.: substantially Ni)} |
|---|---|---|---|---|---|---|---|---|---|---|---|---|---|---|
| | C | Si | Mn | P | S | Cr | Al | Mo | W | N | Ti | B | Fe | Others |
| W0 | 0.033 | 0.24 | 0.47 | 0.012 | 0.001 | 24.59 | 3.49 | 12.40 | — | 0.023 | — | — | — | |
| W1 | 0.032 | 0.11 | 0.57 | 0.010 | 0.002 | 17.89 | 3.26 | 11.50 | 1.98 | 0.009 | 0.23 | 0.0032 | 3.56 | |
| W2 | 0.029 | 0.21 | 0.58 | 0.013 | 0.001 | 23.59 | 3.50 | 9.01 | 2.25 | 0.024 | 0.20 | 0.0029 | 3.09 | Zr: 0.12 |
| W3 | 0.038 | 0.22 | 0.60 | 0.014 | 0.001 | 17.76 | 3.26 | 8.25 | 2.96 | 0.017 | 0.10 | 0.0029 | 4.83 | Hf: 0.14 |
| W4 | 0.019 | 0.10 | 0.42 | 0.008 | 0.001 | 18.41 | 4.40 | 9.11 | — | 0.007 | 0.16 | 0.0030 | 4.84 | Mg: 0.01 |
| W5 | 0.021 | 0.05 | 0.54 | 0.014 | 0.002 | 18.64 | 2.28 | 10.59 | — | 0.016 | 0.12 | 0.0049 | 5.12 | Ca: 0.006 |
| W6 | 0.035 | 0.10 | 0.36 | 0.021 | 0.001 | 15.27 | 3.25 | 8.19 | — | 0.017 | 0.42 | 0.0025 | 4.90 | Nb: 0.21 |
| W7 | 0.030 | 0.14 | 0.53 | 0.014 | 0.001 | 15.80 | 3.02 | 9.07 | 2.02 | 0.024 | 0.19 | 0.0037 | 3.07 | |
| W8 | 0.021 | 0.21 | 0.53 | 0.014 | 0.001 | 17.52 | 3.52 | 9.88 | 1.12 | 0.022 | 0.20 | 0.0033 | 2.92 | |

For evaluating the weldability (weld cracking resistance), 5 test specimens for a bending test were taken from each welded joint. The specimen is, 15 mm thick, 10 mm wide and 200 mm long, and the longitudinal direction thereof corresponds to the direction perpendicular to the weld line with the middle of the width of the welded metal being located in the middle of the longitudinal direction thereof. Each test specimen was subjected to 180° bending, with a bending radius of 20 mm, the surface of the bent portion was observed under a microscope in a visual field magnified 50 times and checked for the occurrence or nonoccurrence of cracking in the HAZ and in the weld metal. When no crack was observed in the 5 test specimens, the weld cracking resistance was evaluated as good "○" and, when cracking occurred in one or more test specimens, the weld cracking resistance was evaluated as poor "×".

A creep rupture test specimen was taken from each welded joint that showed no occurrence of cracking. The test specimen had a parallel portion with an outside diameter of 6 mm and a length of 30 mm and its longitudinal direction was perpendicular to the weld line, and the weld metal was located in the middle of that parallel portion. The creep rupture test was carried out at a temperature of 1,150° C. and a load stress of 7 MPa, and the rupture time of the weld metal was determined.

For evaluating the creep strength of each weld metal, the rupture time obtained was compared with the rupture time obtained by subjecting a specimen taken from the base metal to creep rupture testing under the same conditions as mentioned above. When the rupture time was not shorter than 90% of the rupture time of the base material, the creep strength was evaluated as good "○" and, when it was shorter than 90%, the creep strength was evaluated as unsatisfactory "×". The results obtained in the above manner are shown in Table 4, together with the combinations of base metals and welding consumables.

TABLE 3

| Mark | Chemical Composition of Weld Metal (mass %, bal.: substantially Ni) | | | | | | | | | | | | | BI Value | DI Value | BI/DI |
|---|---|---|---|---|---|---|---|---|---|---|---|---|---|---|---|---|
| | C | Si | Mn | P | S | Cr | Al | Mo | W | N | Ti | B | Fe | Others | | | |
| AJ0 | 0.030 | 0.23 | 0.47 | 0.012 | 0.001 | 24.56 | 3.53 | 11.63 | — | 0.021 | — | — | — | | 81.43 | 91.30 | 0.89 |
| AJ1 | 0.031 | 0.11 | 0.57 | 0.010 | 0.002 | 17.67 | 3.23 | 11.17 | 1.98 | 0.010 | 0.23 | 0.0032 | 3.46 | | 108.40 | 118.38 | 0.92 |
| AJ2 | 0.027 | 0.21 | 0.57 | 0.013 | 0.001 | 23.74 | 3.53 | 9.00 | 1.86 | 0.021 | 0.20 | 0.0029 | 3.07 | Zr: 0.13 | 121.32 | 119.96 | 1.01 |
| AJ3 | 0.035 | 0.21 | 0.59 | 0.014 | 0.001 | 17.77 | 3.27 | 7.89 | 2.94 | 0.017 | 0.10 | 0.0029 | 4.85 | Hf: 0.15 | 121.40 | 117.14 | 1.04 |
| AJ4 | 0.019 | 0.10 | 0.42 | 0.008 | 0.001 | 18.41 | 4.41 | 9.09 | — | 0.010 | 0.13 | 0.0030 | 4.87 | Mg: 0.01 | 104.66 | 122.20 | 0.86 |
| AJ5 | 0.021 | 0.05 | 0.53 | 0.014 | 0.002 | 18.52 | 2.81 | 10.51 | — | 0.016 | 0.10 | 0.0048 | 5.09 | Ca: 0.006 | 119.35 | 169.70 | 0.70 |
| AJ6 | 0.028 | 0.11 | 0.54 | 0.012 | 0.002 | 17.41 | 3.24 | 10.89 | 1.59 | 0.010 | 0.27 | 0.0030 | 3.87 | Nb: 0.04 | 110.47 | 113.99 | 0.97 |
| AJ7 | 0.028 | 0.10 | 0.57 | 0.009 | 0.002 | 17.52 | 3.47 | 11.33 | 2.27 | 0.011 | 0.19 | 0.0034 | 3.45 | | 109.79 | 114.27 | 0.96 |
| AJ8 | 0.030 | 0.13 | 0.56 | 0.011 | 0.002 | 18.90 | 3.35 | 10.94 | 1.60 | 0.009 | 0.23 | 0.0032 | 3.48 | Cu: 0.36 | 111.56 | 120.88 | 0.92 |
| AJ9 | 0.029 | 0.13 | 0.57 | 0.010 | 0.002 | 18.98 | 3.30 | 11.08 | 1.68 | 0.012 | 0.23 | 0.0032 | 3.48 | Co: 1.11 | 110.61 | 122.93 | 0.90 |
| AJ10 | 0.029 | 0.14 | 0.57 | 0.010 | 0.002 | 19.17 | 3.36 | 11.11 | 1.57 | 0.009 | 0.23 | 0.0031 | 3.46 | Nd: 0.01 | 110.01 | 119.00 | 0.92 |
| AJ11 | 0.030 | 0.12 | 0.55 | 0.010 | 0.002 | 18.91 | 3.30 | 11.13 | 1.68 | 0.010 | 0.22 | 0.0032 | 3.48 | Y: 0.01 | 109.96 | 121.30 | 0.91 |
| AJ12 | 0.030 | 0.13 | 0.55 | 0.010 | 0.002 | 19.16 | 3.34 | 10.92 | 1.61 | 0.009 | 0.22 | 0.0032 | 3.45 | La: 0.01 | 110.54 | 121.56 | 0.91 |
| AJ13 | 0.029 | 0.12 | 0.57 | 0.011 | 0.002 | 19.09 | 3.34 | 11.02 | 1.65 | 0.011 | 0.22 | 0.0032 | 3.47 | Ce: 0.01 | 111.24 | 121.13 | 0.92 |
| AJ14 | 0.030 | 0.14 | 0.58 | 0.011 | 0.002 | 19.09 | 3.34 | 10.99 | 1.58 | 0.012 | 0.22 | 0.0030 | 3.47 | Ta: 0.25 | 110.58 | 118.33 | 0.93 |
| BJ1 | 0.030 | 0.13 | 0.56 | 0.010 | 0.002 | 17.92 | 3.47 | 10.79 | 1.61 | 0.009 | 0.26 | 0.0034 | 3.83 | | 114.75 | 117.61 | 0.98 |
| BJ2 | 0.030 | 0.11 | 0.55 | 0.010 | 0.002 | 17.65 | 3.28 | 11.11 | 2.02 | 0.011 | 0.52 | 0.0032 | 3.81 | | 113.28 | 113.62 | 1.00 |
| BJ3 | 0.029 | 0.13 | 0.56 | 0.011 | 0.002 | 17.63 | 3.17 | 11.03 | 1.59 | 0.011 | 0.19 | 0.0033 | 3.44 | | 111.78 | 123.89 | 0.90 |
| BJ4 | 0.031 | 0.14 | 0.56 | 0.011 | 0.002 | 17.53 | 3.26 | 11.10 | 1.65 | 0.010 | 0.18 | 0.0032 | 3.47 | Nb: 0.18 | 114.08 | 119.05 | 0.96 |
| BJ5 | 0.030 | 0.13 | 0.57 | 0.011 | 0.002 | 17.50 | 3.25 | 11.06 | 1.97 | 0.011 | 0.18 | 0.0032 | 3.45 | | 111.88 | 116.47 | 0.96 |
| BJ6 | 0.033 | 0.10 | 0.40 | 0.020 | 0.001 | 15.48 | 3.22 | 8.41 | 0.37 | 0.016 | 0.38 | 0.0026 | 4.53 | Nb: 0.16 | 119.36 | 122.47 | 0.97 |
| BJ7 | 0.029 | 0.14 | 0.54 | 0.014 | 0.001 | 15.91 | 3.04 | 9.12 | 2.01 | 0.022 | 0.19 | 0.0036 | 3.06 | | 119.85 | 143.41 | 0.84 |
| BJ8 | 0.021 | 0.21 | 0.53 | 0.014 | 0.001 | 18.60 | 3.54 | 9.73 | 0.93 | 0.020 | 0.20 | 0.0032 | 2.93 | Zr: 0.02 | 125.19 | 131.23 | 0.95 |

Note 1)
BI value was calculated by a formula [104Si + 1980P + 1980S + 9Al + 15Ti + 11Nb + 1.8W + 11600B]
DI value was calculated by a formula [240 − 1900P − 20000S − 30Al − 10Ti − 9W + 17000B]

TABLE 4

| | Base Metal | | | | Weld Con- | Weld Metal | | | | Difference between ST Values of Weld Metal and Base Metal | Test Results | |
|---|---|---|---|---|---|---|---|---|---|---|---|---|
| Mark | Mark | BI Value | DI Value | BI/DI | ST Value | sumable | BI Value | DI Value | BI/DI | ST Value | | Resistance to Weld Crack | Creep Strength |
| AJ0 | AM0 | 78.82 | 90.60 | 0.87 | 8.15 | W0 | 81.43 | 91.30 | 0.89 | 11.63 | 3.48 | ○ | ○ |
| AJ1 | AM1 | 112.80 | 114.49 | 0.99 | 21.54 | W1 | 108.40 | 118.38 | 0.92 | 26.54 | 5.01 | ○ | ○ |
| AJ2 | AM2 | 118.15 | 134.82 | 0.88 | 17.00 | W2 | 121.32 | 119.96 | 1.01 | 22.59 | 5.59 | ○ | ○ |
| AJ3 | AM3 | 123.00 | 117.47 | 1.05 | 17.93 | W3 | 121.40 | 117.14 | 1.04 | 22.30 | 4.39 | ○ | ○ |
| AJ4 | AM4 | 106.54 | 121.40 | 0.88 | 10.02 | W4 | 104.66 | 122.20 | 0.86 | 16.69 | 6.67 | ○ | ○ |
| AJ5 | AM5 | 108.39 | 124.00 | 0.87 | 11.18 | W5 | 119.35 | 169.70 | 0.70 | 18.91 | 7.73 | ○ | ○ |
| AJ6 | AM6 | 113.31 | 104.40 | 1.09 | 12.24 | W1 | 110.47 | 113.99 | 0.97 | 24.48 | 12.24 | ○ | ○ |
| AJ7 | AM7 | 121.95 | 118.79 | 1.03 | 16.10 | W1 | 109.79 | 114.27 | 0.96 | 25.94 | 9.84 | ○ | ○ |
| AJ8 | AM8 | 126.25 | 136.02 | 0.93 | 16.66 | W0 | 111.56 | 120.88 | 0.92 | 25.29 | 8.63 | ○ | ○ |
| AJ9 | AM9 | 120.81 | 151.32 | 0.80 | 16.03 | W0 | 110.61 | 122.93 | 0.90 | 25.37 | 9.34 | ○ | ○ |
| AJ10 | AM10 | 117.46 | 124.42 | 0.94 | 16.53 | W0 | 110.01 | 119.00 | 0.92 | 25.19 | 8.66 | ○ | ○ |

TABLE 4-continued

| | Base Metal | | | | Weld Con- | Weld Metal | | | | Difference between ST Values of Weld Metal and Base Metal | Test Results | |
|---|---|---|---|---|---|---|---|---|---|---|---|---|
| Mark | Mark | BI Value | DI Value | BI/DI | ST Value | sumable | BI Value | DI Value | BI/DI | ST Value | | Resistance to Weld Crack | Creep Strength |
| AJ11 | AM11 | 115.91 | 143.02 | 0.81 | 17.07 | W0 | 109.96 | 121.30 | 0.91 | 25.59 | 8.52 | ○ | ○ |
| AJ12 | AM12 | 119.12 | 141.82 | 0.84 | 17.04 | W0 | 110.54 | 121.56 | 0.91 | 25.30 | 8.26 | ○ | ○ |
| AJ13 | AM13 | 124.03 | 140.82 | 0.88 | 15.51 | W0 | 111.24 | 121.13 | 0.92 | 25.26 | 9.75 | ○ | ○ |
| AJ14 | AM14 | 119.08 | 118.12 | 1.01 | 16.68 | W0 | 110.58 | 118.33 | 0.93 | 25.20 | 8.52 | ○ | ○ |
| BJ1 | BM1 | 147.21 | 116.50 | * 1.26 | 16.85 | W1 | 114.75 | 117.61 | 0.98 | 25.21 | 8.36 | X | — |
| BJ2 | BM2 | 144.19 | 92.31 | * 1.56 | 19.57 | W1 | 113.28 | 113.62 | 1.00 | 26.14 | 6.58 | X | — |
| BJ3 | BM3 | 134.26 | 103.60 | * 1.30 | 9.03 | W1 | 111.78 | 123.89 | 0.90 | 25.02 | 15.99 | X | — |
| BJ4 | BM4 | 143.24 | 129.00 | * 1.11 | 9.33 | W1 | 114.08 | 119.05 | 0.96 | 25.98 | 16.65 | X | — |
| BJ5 | BM5 | 134.02 | 108.65 | * 1.23 | 12.20 | W1 | 111.88 | 116.47 | 0.96 | 26.02 | 13.82 | X | — |
| BJ6 | AM1 | 112.80 | 114.49 | 0.99 | 21.54 | W6 | 119.36 | 122.47 | 0.97 | 22.17 | * 0.63 | ○ | X |
| BJ7 | AM1 | 112.80 | 114.49 | 0.99 | 21.54 | W7 | 119.85 | 143.41 | 0.84 | 23.74 | * 2.20 | ○ | X |
| BJ8 | AM2 | 118.15 | 134.82 | 0.88 | 17.00 | W8 | 125.19 | 131.23 | 0.95 | 19.53 | * 2.53 | ○ | X |

Note 1) ST Values are calculated by either formulae [Mo + 1.5W + 100Ti] or [Mo + 1.5W + 400C]
Note 2) "*" indicates a value out of the scope of this invention.
Note 3) "—" indicates that the test was not carried out.

As can be seen from Table 4, the welded joints given AJ0 to AJ14, in which the base metal and weld metal both satisfied the conditions specified by the present invention and the relationship between the base metal and weld metal also satisfied the conditions specified by the invention, did not allow occurrence of any crack either in the HAZ or in the weld metal; the creep rupture time of the weld metal was not shorter than 90% of that of the base metal and the creep strength was thus good.

On the contrary, the welded joints given BJ1 to BJ5, in which the contents of respective elements in the base metal and in the weld metal were each within the range specified by the present invention but the base metal did not satisfy the relationship (1) specified by the invention, namely the (BI/DI) value exceeded 1.1, all allowed occurrence of weld cracking in the HAZ, hence the weldability was unsatisfactory.

Further, with the welded joints of BJ6 to BJ8, in which the chemical composition of the base metal and of the weld metal satisfied the conditions specified in the present invention but the relationship between the weld metal ST value and base metal ST value did not satisfy the conditions specified in the present invention, no weld cracking occurred but the creep rupture time was shorter than 90% of that of the base metal, hence the creep strength of the welded joint as a whole was unsatisfactory.

INDUSTRIAL APPLICABILITY

The Ni-base heat resistant alloy of the invention is excellent in weld cracking resistance. The welded joint of the invention shows no weld crack defect in the weld, and the welding joint has high creep strength. Therefore, it manifests excellent characteristics in an environment in which an atmosphere causes carburization and oxidation and in which temperature changes are repeated, such as in cracking furnace and reformer furnace tubes in an ethylene plant. Therefore, the products obtained from the alloy of the present invention make it possible to use them at higher temperatures and prolong the continuous operation time and, furthermore, owing to the improvement in durability, prolong the period until replacement of parts can be extended.

What is claimed is:

1. A Ni-base heat resistant alloy consisting of, on the percent by mass basis, C: not more than 0.1%, Si: not more than 2%, Mn: not more than 2%, P: not more than 0.025%, S: not more than 0.005%, N: not more than 0.04%, Cr: 10 to 30%, Al: 2.1 to less than 4.5%, and Mo: 2.5 to 15% or W: 2.5 to 9% or Mo and W: 2.5 to 15% in total, Ti: 0 to 3%, Nb: 0 to 1%, V: 0 to 1%, Ta: 0 to 2%, Zr: 0 to 0.2%, Hf: 0 to 0.8%, B: 0 to 0.03%, Mg: 0 to 0.01%, Ca: 0 to 0.01%, Fe: 0 to 10%, La: 0 to 0.1%, Ce: 0 to 0.1%, Nd: 0 to 0.1%, Y: 0 to 0.1%, Cu: 0 to 5% and Co: 0 to 10%, and the balance being substantially Ni, satisfying the relation (1) given below:

$$(104Si+1980P+1980S+9Al+15Ti+11Nb+1.8W+11600B) \leq \{1.1(240-20000S-1900P-30Al-10Ti-9W+17000B) \quad (1)$$

wherein the symbols for elements in the above relation (1) are the contents (% by mass) of the respective elements contained in the alloy.

2. A Ni-base heat resistant alloy according to claim 1, wherein the content of Ti is less than 1.5%.

3. A welded joint made of a Ni-base heat resistant alloy wherein each of the base metal and weld metal is made of a Ni-base heat resistant alloy consisting of, on the percent by mass basis, C: not more than 0.1%, Si: not more than 2%, Mn: not more than 2%, P: not more than 0.025%, S: not more than 0.005%, N: not more than 0.04%, Cr: 10 to 30%, Al: 2.1 to less than 4.5%, and Mo: 2.5 to 15% or W: 2.5 to 9% or Mo and W: 2.5 to 15% in total, Ti: 0 to 3%, Nb: 0 to 1%, V: 0 to 1%, Ta: 0 to 2%, Zr: 0 to 0.2%, Hf: 0 to 0.8%, B: 0 to 0.03%, Mg: 0 to 0.01%, Ca: 0 to 0.01%, Fe: 0 to 10%, La: 0 to 0.1%, Ce: 0 to 0.1%, Nd: 0 to 0.1%, Y: 0 to 0.1%, Cu: 0 to 5% and Co: 0 to 10%, and the balance being substantially Ni, and satisfying the relation (1) given below, and further satisfying the condition that the ST value of the weld metal is larger than the ST value of the base metal, and the difference between the former and the latter is not smaller than 3, wherein the ST value is defined by the formula (2) or (3) given below:

$$(104Si+1980P+1980S+9Al+15Ti+11Nb+1.8W+11600B) \leq \{1.1(240-20000S-1900P-30Al-10Ti-9W+17000B) \quad (1)$$

$$\text{in the case of Ti} \leq 4C; \quad ST=Mo+1.5W+100Ti \quad (2)$$

$$\text{in the case of Ti} > 4C; \quad ST=Mo+1.5W+400C \quad (3)$$

wherein the symbols for elements in the formulas (1) to (3) are the contents (% by mass) of the respective elements contained in the base metal or weld metal.

4. A welded joint according to claim 3, wherein the content of Ti is 0.005 to 1.0%.

5. An ethylene cracking furnace tube or reformer furnace tube made of a Ni-base alloy according to claim 1.

6. An ethylene cracking furnace tube or reformer furnace tube having a welded joint according to claim 3.

7. An ethylene cracking furnace tube or reformer furnace tube made of a Ni-base alloy according to claim 2.

8. An ethylene cracking furnace tube or reformer furnace tube having a welded joint according to claim 4.

* * * * *